United States Patent [19]

Dilliplane

[11] 3,934,075

[45] Jan. 20, 1976

[54] CLIP FOR SHIELDED MULTICONDUCTOR FLAT CABLE

[75] Inventor: James John Dilliplane, Etters, Pa.

[73] Assignee: E. I. Du Pont de Nemours and Company, Wilmington, Del.

[22] Filed: Feb. 26, 1974

[21] Appl. No.: 446,516

[52] U.S. Cl. .................... 174/75 R; 29/624; 29/628; 174/36; 174/117 FF; 339/97 C; 339/223 R; 333/84 R

[51] Int. Cl.$^2$ .......................................... H02G 15/08

[58] Field of Search ........ 174/84 C, 88 R, 94 R, 78, 174/36, 117 F, 75 R; 339/17 F, 14 R, 97 R, 97 C, 96, 98, 99, 223 R; 29/628, 630 A, 630 F, 624; 333/84 M, 84 R

[56] References Cited

UNITED STATES PATENTS

| | | | |
|---|---|---|---|
| 3,184,704 | 5/1965 | Raymond et al. | 339/223 R X |
| 3,643,006 | 2/1972 | Ance | 174/94 R X |
| 3,728,473 | 4/1973 | Kuo | 174/94 R X |
| 3,753,213 | 8/1973 | Frey | 174/78 UX |

*Primary Examiner*—Darrell L. Clay

[57] ABSTRACT

A clip is provided for interconnecting a mesh or foil shield and a conductor of a shielded multiconductor flat cable. The clip comprises a pair of hingedly connected arms, the first arm having a pair of upwardly projecting tabular sections for piercing the insulation of the flat cable, each tabular section has a V-shaped groove for receiving and engaging a conductor in the cable; and the second arm has a pair of upwardly projecting points for piercing the insulation from the opposite side of the flat cable and engaging the shield of the cable.

8 Claims, 4 Drawing Figures

Fig. 1
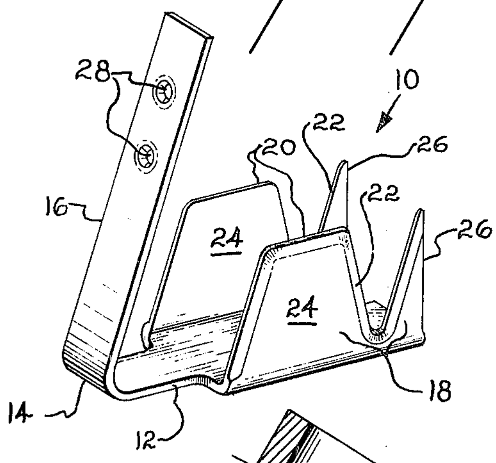
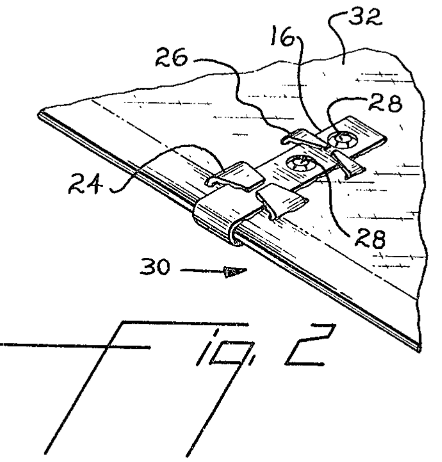
Fig. 2
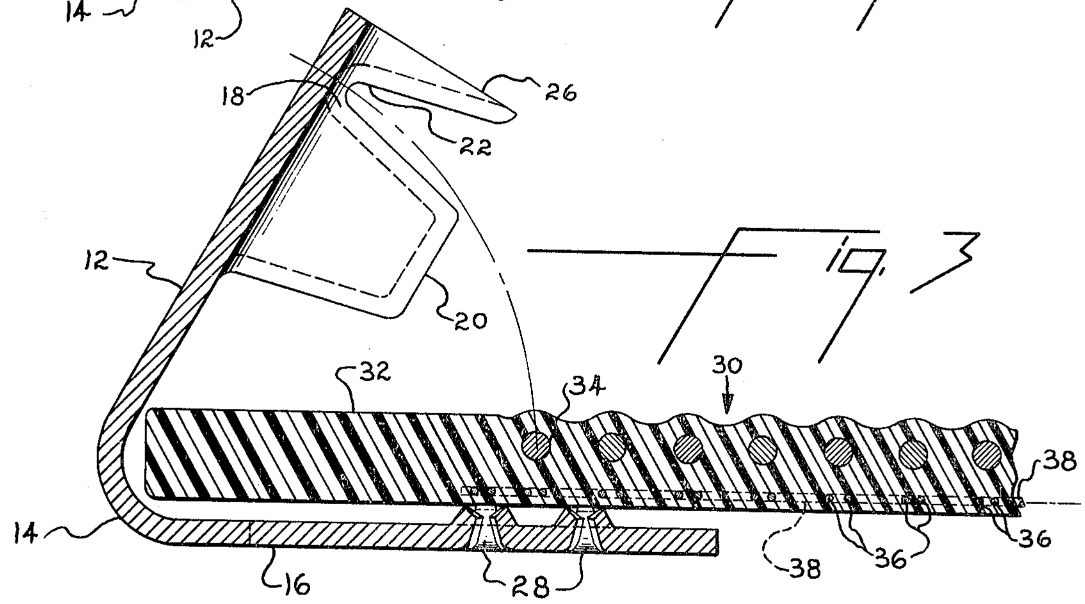
Fig. 3
Fig. 4
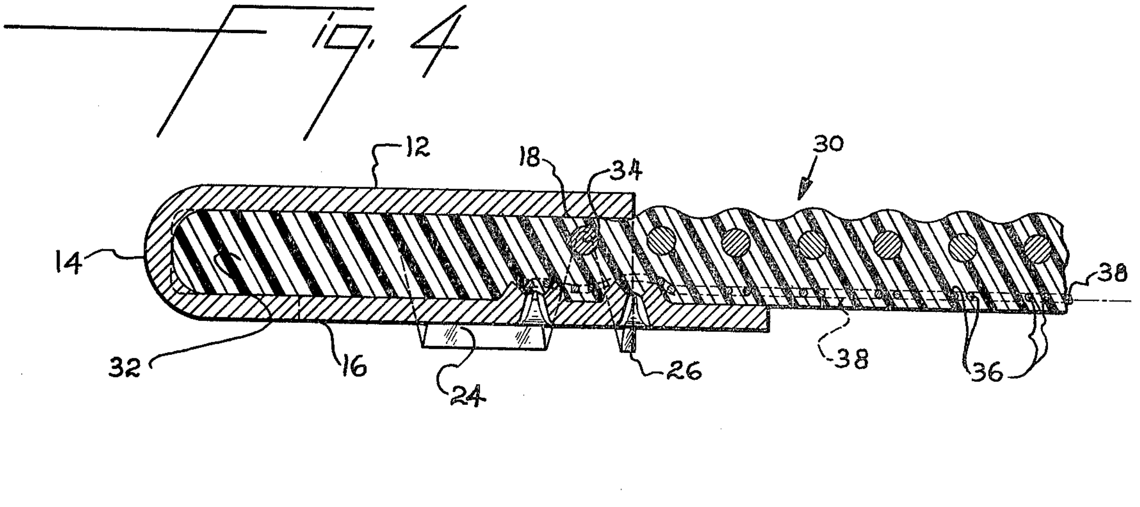

CLIP FOR SHIELDED MULTICONDUCTOR FLAT CABLE

BACKGROUND OF THE INVENTION

Field of the Invention:

The invention relates to electrical connectors, and particularly relates to electrical connectors for electrically interconnecting a mesh or foil shield and a conductor of a shielded multiconductor flat cable. More particularly, the invention relates to a crimpable clip connector for piercing the insulation of a flat cable from opposite sides and electrically interconnecting the cable shield and a conductor in the cable.

Description of the Prior Art:

Clip connectors for multiconductor flat cables are well known in the prior art. A crimpable connecting device for flat conductor cable is described in U.S. Pat. No. 3,395,381, wherein the device has a U-shaped cross section having a web, side walls and a lance struck from the web between the side walls. This device is crimped onto a conductor in a flat conductor cable with the side walls straddling the conductor and bent towards each other to pinch the conductor between the side walls and the lance. Another electrical conductor for very thin sheet metal is described in U.S. Pat. No. 3,138,658. The connector described in this patent has a blade member folded about a center line to form opposed surfaces having a plurality of lanced tangs for insertion into the surface of the sheet metal member. A clip for connecting a sheath of a metallically sheathed cable to a further conductive member is described in U.S. Pat. No. 3,753,213, the connection to a further conductive member is external to the cable. A connector for crimpable coupling of bare or insulated flat conductive material such as the foil shield of a shielded cable to a further conductive material is described in U.S. Pat. No. 3,728,473, the connection to a further conductive material is again external to the cable.

The clip connector of the present invention is readily distinguishable from the clips described in the above mentioned patents, in that, it provides for interconnecting the shield and a conductor of a shielded multiconductor flat cable. The integrally connected conductor in the cable may then be connected to an electrical common or ground to effect the functionality of the shield in the cable.

SUMMARY OF THE INVENTION

According to the present invention there is provided a clip for interconnecting the shield and a conductor of a shielded multiconductor flat cable, comprising a pair of hingedly connected arms, one of the arms having means for piercing insulating material of the cable from one side and engaging the shield in the cable, and the other arm having means for piercing the insulating material from the opposite side of the cable and engaging a conductor of the cable.

In a preferred embodiment of the clip of the present invention, one of the arms has a pair of opposed tabular sections for piercing the insulation of the multiconductor flat cable. Each tabular section has a chamfered sharp edge terminating in a blade and a V-shaped groove for receiving and engaging the conductor in the cable, and one of the arms has at least one upward projecting point for piercing the insulation of the cable from the opposite side and engaging the shield of the cable. Further, in the preferred embodiment the V-shaped groove is formed offcenter in each tabular section to provide a tapered blade for piercing an edge of the insulation adjacent the end conductor and a tapered point for piercing the insulation on the other side of the end conductor. The clip is locked on the flat cable by folding the blades and points of each of the tabular sections over the second arm having the upward projecting point in engagement with the shields of the cable. The base of the tapered point is preferably substantially narrower in width than the spacing between the center of the end conductor in the cable and the adjacent conductor to prevent contacting the conductor adjacent the end conductor. The tapered blade is preferably wider than the point and penetrates an edge of the insulating material extending laterally on either side of the flat cable beyond the regularly spaced conductors in the cable. The mesh or foil shield is also disposed in the insulating material, spaced from the plurality of conductors therein, and may extend laterally beyond the plurality of conductors into continuous edges of insulating material extending beyond the conductors.

Additionally, there is provided in a shielded multiconductor flat cable, comprising a strip of insulating material with continuous edge sections extending laterally on either side of a plurality of longitudinal conductors spaced on regular centers in the insulating material, and a metallic shield spaced from the plurality of conductors in the insulating material; the improvement comprising a clip interconnecting the shield and a conductor in the shielded multiconductor flat cable, the clip comprising a pair of hingedly connected arms, one of the arms having means for piercing the insulating material of the cable from one side and engaging a shield in the cable, and one of the arms having means for piercing the insulating material from the opposite side of the cable and engaging a conductor in the cable.

The clip of the present invention thus provides for rapidly and simply connecting the shield of a shielded multiconductor flat cable to a conductor within the cable, one or both ends of which may then be terminated to an electrically common point or ground to effect the functionality of the shielded mesh or foil in the flat multiconductor cable. The clip obviates the need for peeling back the insulating material of the cable to make an electrical connection with the ground plane or shield by attaching an electrical connector to the shield or soldering an external wire to the shield.

BRIEF DESCRIPTION OF THE DRAWINGS

FIG. 1 is a perspective view of a preferred embodiment of the clip of the present invention.

FIG. 2 is a perspective view of the clip of FIG. 1 crimped onto a shielded multiconductor flat cable.

FIG. 3 is an elevation view of the clip of FIG. 1 positioned for crimping on a shielded multiconductor flat cable.

FIG. 4 is an elevation view similar to FIG. 3, illustrating the clip crimped onto the shielded multiconductor flat cable.

DESCRIPTION OF THE PREFERRED EMBODIMENTS

A preferred embodiment of the clip of the present invention is described below with reference to the attached drawings wherein the same numerals are used throughout to identify the same elements.

With particular reference to FIGS. 1 and 3, a clip 10 according to the present invention comprises a first arm 12 connected through a hinged section 14 to a second arm 16. The first arm 12 has a pair or upwardly projecting tabular sections 18. The tabular sections 18 have a chamfered sharp edge 20 for penetration of the insulating material of the multiconductor flat cable. A V-shaped groove 22 is provided in each of tabular sections 18 toward the end of arm 12 providing a blade section 24 and a point 26 which pierces the insulation 32 of the cable 30 and readily penetrates through the opposite side of the shielded multiconductor flat cable 30. The V-shaped groove 22 receives and engages the end conductor 34 of the multiconductor cable 30. The second arm 16 hingedly connected to arm 12 through section 14 has a pair of lanced tangs 28 formed therein for piercing the insulating material 32 from the opposite side of cable 30 and engaging the shield which comprises a plurality of fine longitudinal wires 36 enmeshed with fine transverse wires 38 within the insulating material 32 of cable 30.

The clip 10 of the present invention is preferably stamped formed from thin electrically conductive sheet metal stock and may be conventionally secured at regular intervals to a thin carrier strip (not illustrated) by severable connecting portions (not illustrated). The clip 10 may be coated with a corrosion resistant and electrically conductive metal coating.

The clip 10 can be readily crimped on a shielded multiconductor flat cable by manual or automatic means. The clip 10 is positioned along an edge of the cable 30, as illustrated in FIG. 3, with arm 16 having the lanced tangs 28 adjacent the flat cable on the side having the shielded mesh or foil closest thereto. Arms 12 and 16 are then crimped on the edge of the insulating material 32, and blade section 24 and point section 26 on each of the opposing tabs 18 penetrate the insulation 32, and groove 22 receives and engages the end conductor 34 of the multiconductor flat cable 30. The blade section 24 and point section 26 on each of the opposing tabs 18 penetrate through the insulation 32 and emerge on the opposite side of cable 30. The blade sections 24 and point sections 26 are crimped over arm member 16 to lock the clip 10 on the cable 30. Suitable crimp tooling for crimping the clip 10 on the shielded multiconductor flat cable will be readily apparent to one skilled in the art.

While the above description and attached drawings illustrate a preferred embodiment of the clip of the present invention, it is apparent that other embodiments and modifications are equivalent and will be obvious to one skilled in the art, therefore, the invention is not to be limited except by the appended claims.

What is claimed is:

1. A clip for interconnecting a shield and a single conductor of a shielded multiconductor flat cable, comprising a pair of hingedly connected substantially flat arms, one of said arms having at least one projecting point for piercing a first side of an insulating material of the cable and engaging the shield of the cable, said other arm having a pair of opposed, upwardly-projecting, tabular sections for piercing the other side of the insulating material of the cable, each tabular section having a V-shaped groove for receiving and engaging a single conductor in the cable.

2. A clip, as recited in claim 1, wherein each tabular section comprises a tapered blade and a tapered point for penetrating the opposite side of the insulating material and locking over the other arm to secure the clip on the cable.

3. A clip, as recited in claim 1, wherein said one of said arms has a plurality of said points for penetrating the insulating material of the cable and engaging the shield.

4. In a shielded multiconductor flat cable, the improvement comprising a clip electrically interconnecting a shield and a conductor in the cable, comprising a pair of hingedly connected arms, one of the arms having means piercing the insulating material of the cable from one side and engaging a shield in the cable, and one of the arms having means piercing the insulating material from the opposite side of the cable and engaging a conductor in the cable.

5. A cable, as recited in claim 4, said means for engaging a conductor in the cable comprising a pair of opposed tabular sections, each tabular section including a tapered blade and a tapered point, wherein a base of each tapered point is narrower in width than the distance between centers of said conductor and an adjacent conductor in the cable.

6. A cable as recited in claim 5, wherein each tabular section has a sharpened edge for penetrating the insulating material of the cable.

7. A cable, as recited in claim 4, wherein said shield comprises a wire mesh.

8. A cable, as recited in claim 4, wherein said shield comprises a metallic foil.

* * * * *